United States Patent [19]

Kohlhase

[11] Patent Number: 4,873,032
[45] Date of Patent: Oct. 10, 1989

[54] POUR HOLE CLOSER, STRAIGHT IN TYPE, FOR USE WITH INJECTION FOAM MOLDING SYSTEM

[75] Inventor: Webster Kohlhase, Portsmouth, N.H.
[73] Assignee: Davidson Textron Inc., Dover, N.H.
[21] Appl. No.: 182,839
[22] Filed: Apr. 18, 1988
[51] Int. Cl.$^4$ .................. B29C 67/22; B29B 17/00
[52] U.S. Cl. .................. 264/39; 264/46.6; 264/328.6; 264/DIG. 83; 425/127; 425/129.1; 425/543; 425/817 R
[58] Field of Search .............. 264/DIG. 83, 46.6, 39, 264/328.6; 425/543, 817 R, 127, 129.1

[56] References Cited

U.S. PATENT DOCUMENTS

| | | | |
|---|---|---|---|
| 3,849,074 | 11/1974 | Ficklinger et al. | 264/39 X |
| 4,129,636 | 12/1978 | Boden et al. | 264/DIG. 83 |
| 4,141,470 | 2/1979 | Schultz | 264/DIG. 83 |
| 4,188,356 | 2/1980 | Weber et al. | 264/DIG. 83 |
| 4,314,955 | 2/1982 | Boden et al. | 264/DIG. 83 |
| 4,372,352 | 2/1983 | Coppola et al. | 264/39 X |

Primary Examiner—Philip Anderson
Attorney, Agent, or Firm—John C. Evans

[57] ABSTRACT

A pour hole closure for use with an injection foam molding system including a mold assembly having a pour bushing leading to a reaction chamber. A cylinder having a slightly oversized plastic plug extending downwardly therefrom is normally positioned above the pour bushing in the mold assembly. The cylinder is pivotally movable away from its normal position against the force of resilient means. A pour head and nozzle assembly is adapted to move into engagement with the cylinder to move the latter while attaining a position wherein the nozzle is positioned above the pour bushing. The nozzle is lowered to engage the top edge of the pour bushing for injection of foam material into the reaction chamber. Upon being retracted, the pour head and nozzle are moved laterally, permitting the cylinder and plug to be urged by the resilient means back to their normal position, enabling the plug to be vertically lowered into and compressed within the pour bushing, to thereby scrape any residual foam from the inner surface of the pour bushing and to prevent chemicals from leaking into the annular sealed surface between the pour bushing and the plug during the reaction period.

10 Claims, 3 Drawing Sheets

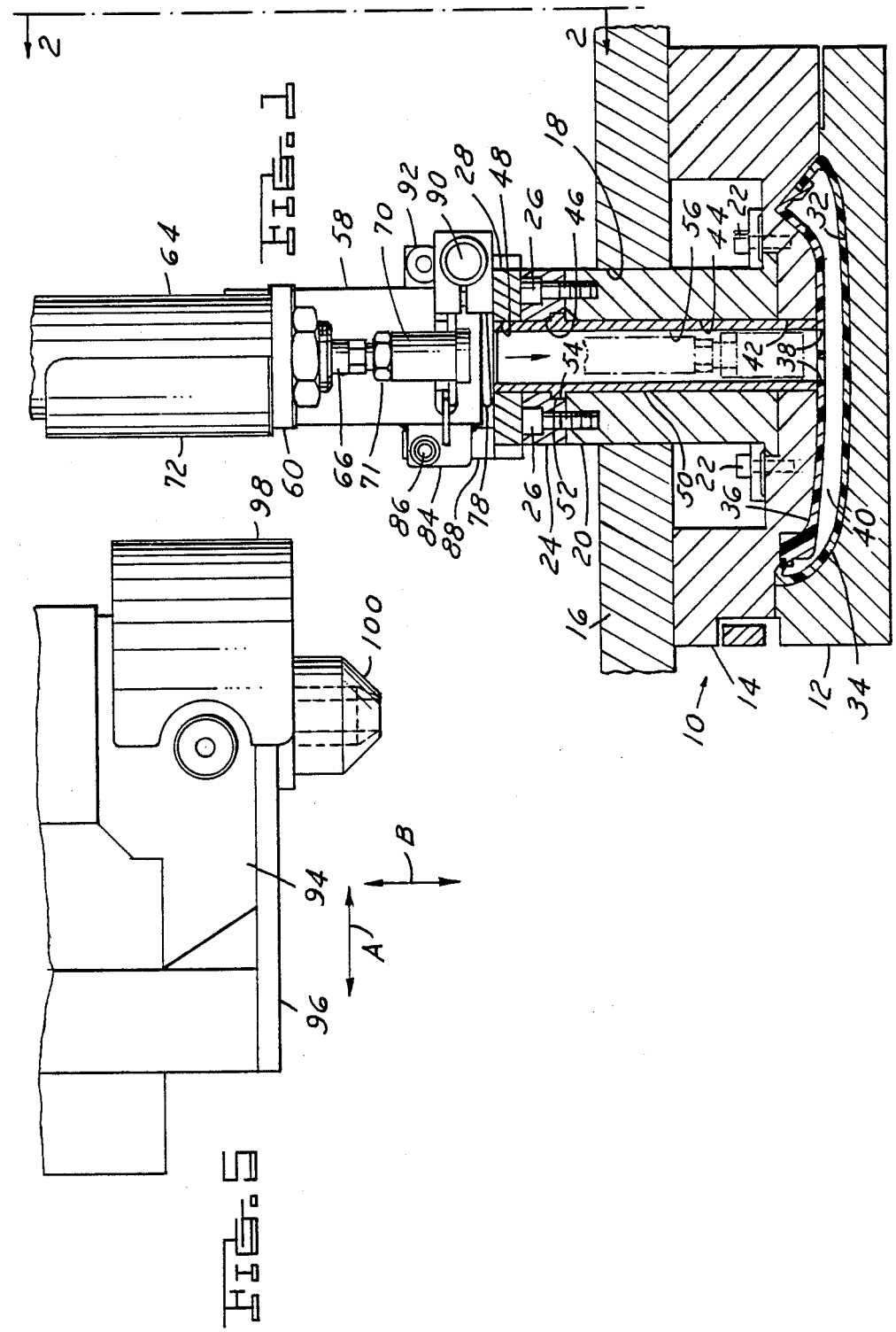

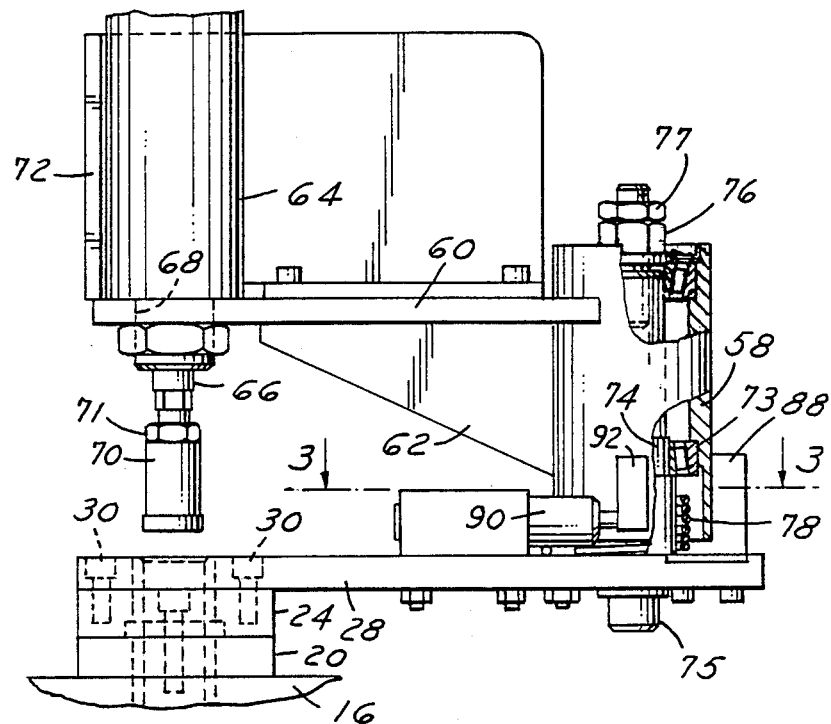
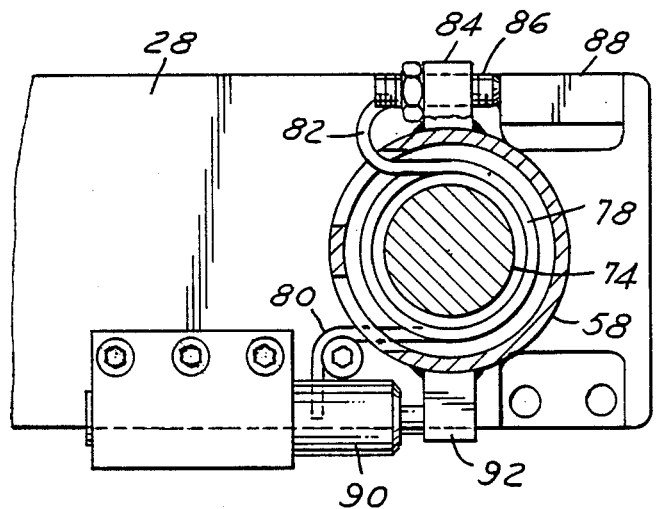

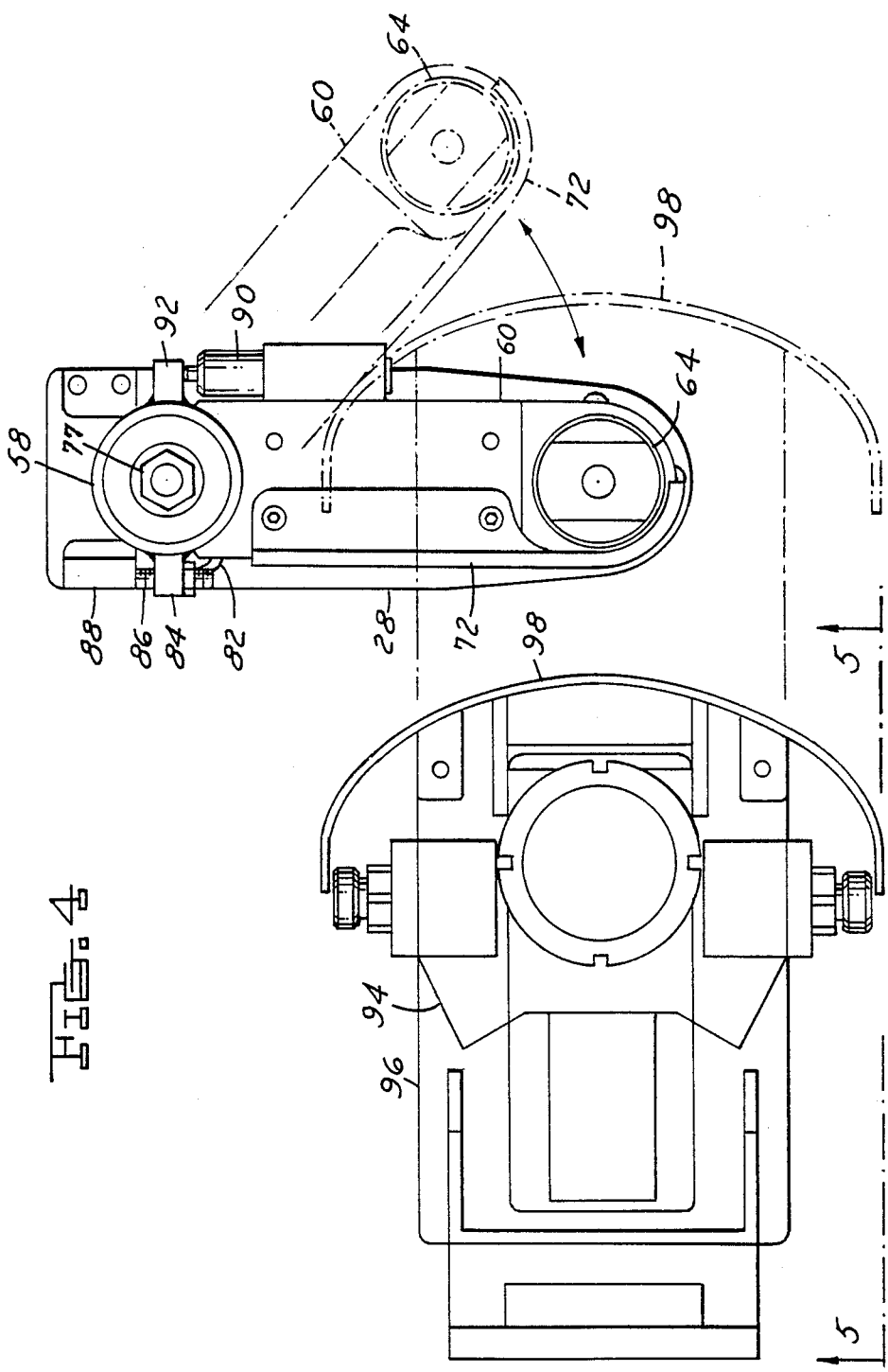

POUR HOLE CLOSER, STRAIGHT IN TYPE, FOR USE WITH INJECTION FOAM MOLDING SYSTEM

TECHNICAL FIELD

This invention relates generally to the injection molding of foamed plastic articles and, more particularly, to the apparatus and process involved in pouring the foam into the mold and plugging the pour opening thereof after pouring.

BACKGROUND ART

Heretofore, in the injection molding of foamed plastic articles, such as an automotive glove box door, a sprue has been formed in the pour opening once the foamable mixture has expanded into conformity with the mold surface, as may be seen in U.S. Pat. No. 4,133,858 to Hayakawa et al..

In other instances, the pour opening has been plugged, but in an inefficient manner, such that time consuming manual cleaning of the pour opening is required due to the manner in which the pour opening is plugged after the foamable mixture has been injected into the mold. For example, in the molding system shown and described in U.S. Pat. No. 3,642,392, to Vanderhagen, a hinged cover is provided with an external conical surface machined to match the internal surface of the pour opening. However, by virtue of being rotated in an arcuate path into the pour opening, the conical surface cannot scrape any foam formation from the inner surface of the pour opening, or prevent leakage of chemicals into the space between the surfaces of the pour opening and the conical surface during the foam reaction process.

DISCLOSURE OF THE INVENTION

Accordingly, a general object of the invention is to provide an improved system of injection foam molding wherein buildup of foam material on the surface of the pour opening is automatically prevented.

Another object of the invention is to provide an improved injection foam molding system including a vertically aligned, tight fitting plug and pour opening relationship, whereby the occasion of foam material forming or existing on the pour opening surface is prevented.

A further object of the invention is to provide an injection foam molding system including a hardened and polished tool steel pour bushing and a vertically aligned plug therefore formed f a polyethylene material which is a predetermined amount larger in diameter than the inside diameter of the pour bushing.

Still another object of the invention is to automate the alternate positioning of the pour head nozzle and the pour opening plug in vertical alignment with the axis of the pour opening.

These and other objects and advantages of the invention will become more apparent when reference is made to the following drawings and accompanying description.

BRIEF DESCRIPTION OF THE DRAWINGS

FIG. 1 is a front elevational view in partial cross section of a mold assembly embodying the invention;

FIG. 2 is a side elevational view taken along the plane of line 2—2 of FIG. 1, and looking in the direction of the arrows;

FIG. 3 is a cross-sectional view taken along the plane of the line 3—3 of FIG. 2, and looking in the direction of the arrows;

FIG. 4 is a top view of a portion of the FIG. 1 structure and a cooperating pour head assembly; and FIG. 5 is a side elevational view of a portion of the FIG. 4 structure taken along the plane of the line 5—5 and looking in the direction of the arrows.

BEST MODE OF CARRYING OUT THE INVENTION

Referring now to the drawings in greater detail, FIG. 1 illustrates a mold assembly 10 having a lower base 12 and an upper housing 14 covered by a mounting plate 16 having an opening 18 formed therein. An adapter 20 extends through the opening 18 and is secured by mounting screws 22 to the upper housing 14. A mounting collar 24 is secured by the mounting screws 26 to the adapter 20. A mounting plate 28 is secured by mounting screws 30 (FIG. 2) to the mounting collar 24. The housing 14 and the lower base 12, enclose a reaction chamber 32. Typically, a vent opening (not shown) is formed through a side portion of the housing 14, to vent trapped air from the reaction chamber 32 during the reaction process.

In accordance with usual practise, a shell or facing 34 is mounted in the bottom surface portion of the reaction chamber 32, while a mounting insert 36 is mounted in the upper portion of the chamber 32, connected at its peripheral edge to the peripheral edge of the shell 34. An inlet opening 38 is formed through a central portion of the mounting insert 36 for communication with the space 40 contained within the shell 34 and the insert 36. Openings 42, 44, 46 and 48 are formed in the upper housing 14, the adapter 20, the mounting collar 24 and the mounting plate 28, respectively, axially aligned with the inlet opening 38. A pour bushing 50 is mounted in the openings 42, 44, 46 and 48, having a collar 52 confined between an annular notch 54 formed in the mounting collar 24 and the top surface of the adapter 20. The pour bushing 50 is formed of a hardened and polished tool steel, and provides a pour opening 56.

As better seen in FIG. 2, a bearing housing 58 is operatively mounted on the mounting plate 28. A cylinder bracket 60 is secured at one end thereof to the bearing housing 58, and supported by a support member 62 so as to extend substantially parallel to the mounting plate 28. A cylinder 64 is mounted atop the distal end of the cylinder bracket 60 such that its cylinder rod 66 extends downwardly through an opening 68 formed adjacent the distal end. A plug 70 is secured by a lock nut 71 to the end of the cylinder rod 66. The plug 70 is formed of a suitable plastic material, such as polyethylene, with an outside diameter a predetermined amount larger than the inside diameter of the pour opening 56, for a purpose to be described. A bumper 72 is mounted on the cylinder bracket 60, partially surrounding the cylinder 64.

As shown in FIG. 2, two bearings 73 are mounted between the bearing housing 58 and a center post 74 secured by a screw 75 to the mounting plate 28. An adjusting nut 76 and lock nut 77 are attached to the upper end of the center post 74 for adjusting the axial clearance of the bearings 73. A torsion spring 78, secured at its ends 80 and 82 (FIG. 3) to the mounting plate 28 and a bracket 84 secured to the bearing housing 58. An adjustable stop screw 86 is mounted through the bracket 84 for being urged by the torsion spring 78 into contact with a stop member 88 mounted on the mounting plate 28. A shock absorber 90 is mounted on the mounting plate 28 for contact with a bracket 92 secured to the bearing housing 58.

Referring now to FIG. 4, a pour head 94 is secured to a reciprocally mounted bracket 96. A pour head bumper 98 is secured to the bracket 96, for a purpose to be described. A nozzle 100 (FIG. 5) is formed on the lower end of the pour head 94. As indicated by the arrows A and B, the pour head 94 and nozzle 100 assembly is adapted to move both laterally and vertically by suitable drive means (not shown).

In operation, the free standing positions of the respective cylinder 64 and pour head 94 assemblies are as shown in FIG. 4. At the start of each cycle, the pour head 94 assembly is caused to move laterally toward the cylinder 64 assembly, such that the pour head bumper 98 contacts the cylinder bracket bumper 72, and continues to move to the phantom line position, thereby causing the cylinder 64 assembly to pivot about the center post 74 (FIG. 2) to the phantom line position shown, against the force of the torsion spring 78. The movement serves to position the nozzle 100 directly above the pour opening 56. The pour head 94 assembly and nozzle 100 are then lowered into contact with the inner peripheral edge of the pour bushing 50.

A predetermined volume of foam is then delivered from the pour head assembly 94 via the nozzle 100, the pour opening 56 and the inlet opening 38 to the space 40 of the reaction chamber 32. The pour head assembly 94 and nozzle 100 are then retracted upwardly and laterally, permitting the torsion spring 78 to urge the cylinder 64 assembly back to its normal position directly above the pour opening 56. The adjustable stop screw 86 on the bearing housing 58 maintains accurate alignment between the plug 70 and the pour opening 56 while the shock absorber 90 softens the impact of the stop screw 86 against the stop member 88.

The cylinder 64 is then actuated to extend its cylinder rod 66 downwardly to thereby compress and insert the diametrally oversized plug 70 into the pour opening 56. Being oversize, the plug 70 forms such a tight fit in the pour opening 56 as it is being linearly inserted, that the pour opening is kept clean by virtue of the plug scraping the residual foam from the inner surface of the pour bushing 50. The scraping process is enhanced by the hardened and polished tool steel of the bushing 50 serving to reduce the incidence of foam sticking to the surface thereof. The resultant tight fit is also effective as a seal in preventing chemicals from leaking into the annular sealed surface during the foam reaction period, inasmuch as the plug 70 sits atop the inlet opening 38 of the mounting insert 36, as shown in phantom in FIG. 1.

The polyethylene material of which the oversize plug 70 is formed has high resistance to abrasion and is self-lubricating yet flexible enough to withstand compression loads as it is repeatedly inserted into and removed from the pour opening 56.

INDUSTRIAL APPLICABILITY

It should be apparent that the invention provides an efficient mold filling and plugging arrangement for forming foam articles, wherein the formation of a pouring sprue is completely eliminated, and the need to clean the pour opening thereof is virtually eliminated.

It should also be apparent that the invention provides an improved means for alternately aligning the pour nozzle and pour plug with the axis of the pour opening.

While but one embodiment has been shown and described, other modifications thereof are possible within the scope of the following claims.

The embodiments of the invention in which an exclusive property or privilege is claimed are defined as follows:

1. In conjunction with filling a cavity in a mold by injecting a foam material through a pour opening therein leading to said cavity, a method plugging the pour opening during the reaction period of said foam material curing in said cavity, said method comprising the steps of:
   (a) moving a vertically oriented power cylinder including a cylinder rod having a plug of flexible plastic material formed on the lower end thereof laterally into position above and in axial alignment with the pour opening;
   (b) activating said cylinder so as to project said plug vertically downwardly into said pour opening to effect flexure of said plug so that said plug has sliding and sealing interference ft with said pour opening during the foam reaction period; and
   (c) retracting the cylinder rod and plug from said pour opening subsequent to said reaction period to clear said pour opening.

2. The method described in claim 1, and further including the steps of moving a pour head laterally to engage and cause said power cylinder to pivot away from a normal position in axial alignment with said pour opening against the force of a torsion spring, said torsion spring subsequently serving to return said cylinder into axial alignment with said pour opening when aid pour head is moved away from engagement with said power cylinder position.

3. A process for filling a mold chamber in a mold with a molding mixture comprising the steps of providing a pour bushing with a cylindrical passage therethrough for the molding mixture leading from a feed station external of said mold into said mold chamber, moving a pour head containing the molding mixture from a start position to said feed station, injecting a quantity of the molding mixture from said pour head into said mold chamber through said passage in said pour pushing until said chamber has a quantity of molding mixture therein, moving said pour head from said feed station, moving a pour passage closer defined by a cylindrical plug of flexible plastic material of a diameter sufficient to provide a sliding interference fit to said feed station into alignment with said cylindrical passage, axially moving said plug in said passage to a point adjacent to said mold chamber to physically scrape and clean the walls of said passage of mold material and to positively seal said passage to prevent the subsequent entry of material into said chamber and the exit of material from said chamber.

4. A pour hole closer for use with a foam molding system including a mold having a reaction chamber and an opening formed therein communicating with said chamber, a pour bushing mounted to said mold having an axial passage therethrough defined by a cylindrical inner wall of a selected diameter that communicates with said opening, a pour head adapted to contain moldable foam material, and a nozzle extending downwardly from said pour head for injecting said foam material into said reaction chamber through said axial passage in said pour bushing, the improvement comprising bracket means mounted on said mold, a power cylinder mounted on said bracket means having a cylinder rod operatively mounted therein and extending vertically downwardly from the lower end thereof and an annular plug of a flexible plastic material operatively mounted on the free end of said cylinder rod for insertion into said axial passage in said bushing after foam material from said pour head has been injected into said reaction chamber through said nozzle and said nozzle has been removed from said pour bushing, said cylinder rod having a width less than the diameter of said axial passage and said flexible plug having a diameter normally greater than the diameter of said axial passage so that said plug has an interfering and sliding fit within said passage to scrape any residual foam from said cylindrical inner wall of said pour bushing when inserted and moved in said passage to fully block said passage and said reaction chamber when positioned in said axial passage adjacent to said opening to prevent entry of material into said chamber or the exit of material from said chamber.

5. The improvement described in claim 4, wherein said plug is cylindrical and further includes attachment means for securing said plug on the free end of said rod, said plug being subject to radial compression loads by said cylindrical inner wall defining said opening while being inserted and while confined in said passage in said pour bushing.

6. The improvement described in claim 4, wherein said bracket means includes a bearing housing pivotally mounted on said mold and a cylinder bracket secured at one end thereof to said bearing housing and amounting means securing said cylinder to the distal end of said cylinder bracket.

7. The improvement described in claim 6, and resilient spring means operatively connected to said bearing housing for turning said bearing housing on said cylinder bracket to automatically said plug above and in operative alignment with said axial passage of said pour bushing.

8. The improvement described in claim 7, wherein said resilient spring means consists of a torsion spring operatively connected between said bearing housing and said mold.

9. The improvement described in claim 7, and a stop member on said mold, an adjustable stop means on said bearing housing for contacting said stop member secured to said mold, adjustment means carried by said adjustable stop means for adjusting the axial position of said plug with respect to the axis of said passage in said pour bushing.

10. The improvement described in claim 7, and first and second bumper means formed on said pour head and said bracket means such that the lateral movement of said pour head causes said first bumper means to move said power cylinder and plug aside against the force of said resilient spring means.

* * * * *